(12) United States Patent
Irie

(10) Patent No.: US 10,572,143 B2
(45) Date of Patent: *Feb. 25, 2020

(54) IMAGING SYSTEM AND IMAGING CONTROL METHOD WITH PAN/TILT CONTROL

(71) Applicant: FUJIFILM Corporation, Tokyo (JP)

(72) Inventor: Fuminori Irie, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 15/928,757

(22) Filed: Mar. 22, 2018

(65) Prior Publication Data

US 2018/0284966 A1  Oct. 4, 2018

Related U.S. Application Data

(63) Continuation of application No. PCT/JP2016/072210, filed on Jul. 28, 2016.

(30) Foreign Application Priority Data

Sep. 25, 2015  (JP) .................. 2015-188539

(51) Int. Cl.
*G06F 3/0488* (2013.01)
*H04N 7/08* (2006.01)
(Continued)

(52) U.S. Cl.
CPC .......... *G06F 3/0488* (2013.01); *G03B 17/18* (2013.01); *G03B 17/561* (2013.01);
(Continued)

(58) Field of Classification Search
CPC ...... G03B 17/02; G03B 17/18; G03B 17/561; G03B 2206/00; G06F 2203/04106;
(Continued)

(56) References Cited

U.S. PATENT DOCUMENTS 5,396,287 A    3/1995  Cho
6,977,678 B1  12/2005  Wada et al.
(Continued)

FOREIGN PATENT DOCUMENTS

CN    103414872 A    11/2013
CN    103533246 A     1/2014
(Continued)

OTHER PUBLICATIONS

International Preliminary Report on Patentability and Written Opinion of the International Searching Authority (forms PCT/IB/373 and PCT/ISA/237), dated Mar. 27, 2018, for International Application No. PCT/JP2016/072210, with an English translation of the Written Opinion.

(Continued)

*Primary Examiner* — Afroza Chowdhury
(74) *Attorney, Agent, or Firm* — Birch, Stewart, Kolasch & Birch, LLP

(57) ABSTRACT

An imaging system includes display means for displaying image data on a display screen, designation receiving means for receiving an arbitrary position designated by a user on the display screen, time measurement means for measuring a first time until a second position is designated after a first position where a first designated object is displayed on the display screen is designated, determination means for determining whether the first time is shorter than a first threshold time, acquisition means for acquiring a third position which is a position of the first designated object on the display screen when the second position is designated, and averaging means for performing simple averaging or weighted averaging for the second position and the third position to acquire a fourth position.

11 Claims, 14 Drawing Sheets

(51) Int. Cl.
*G06F 3/041* (2006.01)
*G06F 3/0485* (2013.01)
*H04N 5/232* (2006.01)
*G03B 17/02* (2006.01)
*G03B 17/18* (2006.01)
*H04N 7/18* (2006.01)
*G03B 17/56* (2006.01)
*H04N 5/225* (2006.01)

(52) U.S. Cl.
CPC .......... *G06F 3/0418* (2013.01); *G06F 3/0485* (2013.01); *H04N 5/23216* (2013.01); *H04N 5/23293* (2013.01); *H04N 5/23299* (2018.08); *H04N 5/232061* (2018.08); *H04N 7/18* (2013.01); *H04N 7/183* (2013.01); *G03B 17/02* (2013.01); *G03B 2206/00* (2013.01); *G06F 2203/04106* (2013.01); *H04N 5/2252* (2013.01)

(58) Field of Classification Search
CPC .... G06F 3/0418; G06F 3/0485; G06F 3/0488; H04N 5/2252; H04N 5/232061; H04N 5/23216; H04N 5/23293; H04N 5/23299; H04N 7/18; H04N 7/183
See application file for complete search history.

(56) References Cited

U.S. PATENT DOCUMENTS

| | | | |
|---|---|---|---|
| 2006/0070111 A1 | 3/2006 | Kurosawa | |
| 2006/0078329 A1 | 4/2006 | Ohnishi et al. | |
| 2008/0111891 A1 | 5/2008 | Kurita et al. | |
| 2013/0010170 A1* | 1/2013 | Matsuzawa | G06F 3/041 348/333.01 |
| 2013/0342712 A1 | 12/2013 | Kozakura | |
| 2014/0223376 A1 | 8/2014 | Tarvainen et al. | |
| 2015/0077379 A1 | 3/2015 | Hirako | |
| 2016/0098138 A1* | 4/2016 | Park | G06F 3/0416 345/173 |
| 2016/0191783 A1 | 6/2016 | Bao et al. | |
| 2018/0234635 A1* | 8/2018 | Hayashi | G03B 17/02 |

FOREIGN PATENT DOCUMENTS

| | | |
|---|---|---|
| CN | 104469167 A | 3/2015 |
| CN | 104717419 A | 6/2015 |
| JP | 5-236319 A | 9/1993 |
| JP | 2001-69496 A | 3/2001 |
| JP | 2004-356711 A | 12/2004 |
| JP | 2006-101009 A | 4/2006 |
| JP | 2006-115046 A | 4/2006 |
| JP | 2008-124812 A | 5/2008 |
| JP | 2008-204384 A | 9/2008 |
| JP | 2013-246313 A | 12/2013 |
| JP | 2013-246614 A | 12/2013 |
| JP | 2014-7662 A | 1/2014 |
| KR | 10-1383111 B1 | 4/2014 |

OTHER PUBLICATIONS

International Search Report (form PCT/ISA/210), dated Oct. 4, 2016, for International Application No. PCT/JP2016/072210, with an English translation.
Japanese Decision to Grant a Patent, dated Apr. 18, 2018, for Japanese Application No. 2017-541461, with an English machine translation.
International Preliminary Report on Patentability and Written Opinion of the International Searching Authority (forms PCT/IB/373, PCT/ISA/237 and PCT/IB/326), dated Mar. 8, 2018, for International Application No. PCT/JP2016/071039, with an English translation of the Written Opinion.
International Search Report (form PCT/ISA/210), dated Sep. 27, 2016, for International Application No. PCT/JP2016/071039, with an English translation.
Chinese Office Action and Search Report for Chinese Application No. 201680055570.8, dated Oct. 8, 2019, with an English translation.

* cited by examiner

FIG. 1
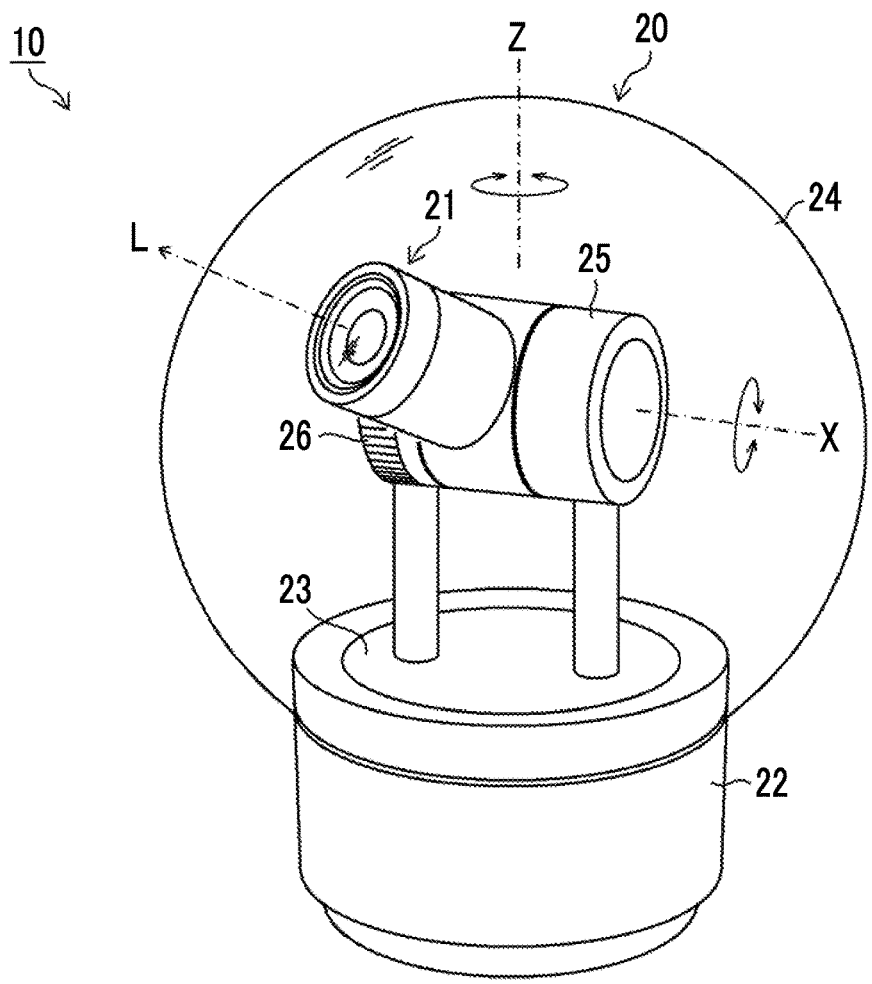
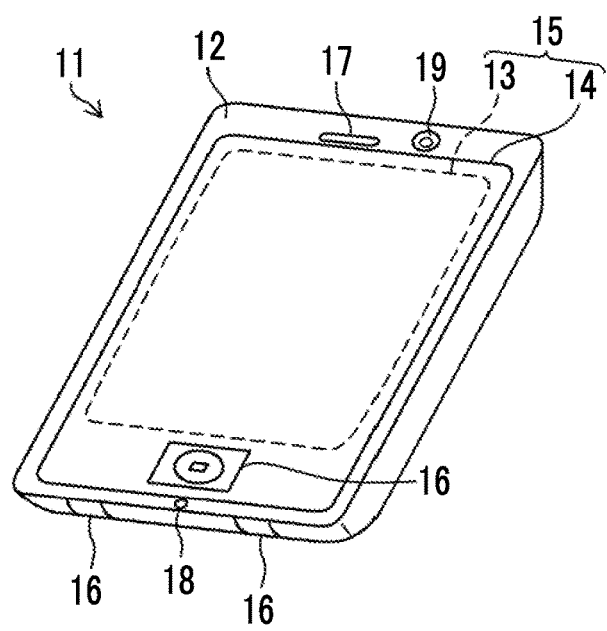

IMAGING SYSTEM AND IMAGING CONTROL METHOD WITH PAN/TILT CONTROL

CROSS-REFERENCE TO RELATED APPLICATIONS

The present application is a Continuation of PCT International Application No. PCT/JP2016/072210 filed on Jul. 28, 2016 claiming priority under 35 U.S.C. § 119(a) to Japanese Patent Application No. 2015-188539 filed on Sep. 25, 2015. Each of the above applications is hereby expressly incorporated by reference, in their entirety, into the present application.

BACKGROUND OF THE INVENTION

1. Field of the Invention

The present invention relates to an imaging system and an imaging control method, and more particularly, to an imaging system and an imaging control method that display an image captured by a remotely controlled pan/tilt camera in real time.

2. Description of the Related Art

An imaging system has been known which remotely controls a camera such that the camera is panned or tilted to adjust the imaging direction of the camera.

JP2004-356711A discloses a technique which, in a case in which a touch panel for displaying an image is pressed, drives an optical axis of an optical system in a pan direction and a tilt direction according to the pressed position to display the pressed image at a substantially central position of a display screen. According to the technique disclosed in JP2004-356711A, an object displayed at an arbitrary position of the display screen can be displayed at a substantially central position of a display screen.

SUMMARY OF THE INVENTION

In a case in which an object displayed at a target position of the display screen is designated, an error is likely to occur in the designated position. For example, in a case in which the touch panel is used as in JP2004-356711A, the pressure area of a finger varies depending on, for example, the thickness or hardness of the finger of the user or pressing force. Therefore, it is difficult to accurately designate a position, which causes an error in the designated position. In this case, it is difficult to display a desired object at a target position. Particularly, in a case in which the user wants to strictly display an object at a target position, it is difficult to display the object at the target position even when the object is designated a plurality of times.

The invention has been made in view of the above-mentioned problems and an object of the invention is to provide an imaging system and an imaging control method that improve operability in a case in which a desired object is designated.

In order to achieve the object, an aspect of an imaging system includes: a camera that acquires image data; pan/tilt means for rotating the camera in a pan direction and a tilt direction perpendicular to the pan direction; display means for displaying the image data on a display screen; designation receiving means for receiving an arbitrary position designated by a user on the display screen; first conversion means for, in a case in which a first position on the display screen is designated, converting a difference between the first position on the display screen and a target position on the display screen into a first amount of rotation which is an amount of rotation by the pan/tilt means; pan/tilt control means for controlling the pan/tilt means such that the camera is rotated by the first amount of rotation as an amount of controlled rotation and a first designated object displayed at the first position is displayed at the target position; time measurement means for measuring a first time until a second position on the display screen is designated after the first position is designated; determination means for determining whether the first time is shorter than a first threshold time; acquisition means for acquiring a third position which is a position of the first designated object on the display screen when the second position is designated; averaging means for performing simple averaging or weighted averaging for the second position and the third position to acquire a fourth position; and second conversion means for converting a difference between the fourth position and the target position into a second amount of rotation which is an amount of rotation by the pan/tilt means. In a case in which the determination means determines that the first time is shorter than the first threshold time, the pan/tilt control means controls the pan/tilt means such that the camera is rotated by the second amount of rotation as a new amount of controlled rotation and a second designated object displayed at the fourth position is displayed at the target position.

According to this aspect, simple averaging or weighted averaging is performed for the second position and the position of the first designated object on the display screen when the second position is designated to acquire the fourth position and the difference between the fourth position and the target position is converted into the second amount of rotation which is the amount of rotation by the pan/tilt means. In a case in which the determination means determines that the first time until the second position is designated after the first position is designated is shorter than the first threshold time, the camera is rotated by the second amount of rotation as a new amount of controlled rotation and the second designated object displayed at the fourth position is displayed at the target position. Therefore, it is possible to improve operability in a case in which a desired object is designated.

Preferably, the imaging system further includes third conversion means for converting a difference between the second position on the display screen and the target position on the display screen into a third amount of rotation which is an amount of rotation by the pan/tilt means. Preferably, in a case in which the determination means determines that the first time is equal to or longer than the first threshold time, the pan/tilt control means controls the pan/tilt means such that the camera is rotated by the third amount of rotation as a new amount of controlled rotation and a third designated object displayed at the second position is displayed at the target position. With this configuration, in a case in which the first time is equal to or longer than the first threshold time, the third designated object displayed at the second position can be displayed at the target position.

Preferably, the imaging system further includes: third conversion means for converting a difference between the second position on the display screen and the target position on the display screen into a third amount of rotation which is an amount of rotation by the pan/tilt means; and difference determination means for determining whether the difference between the second position and the target position is greater than a first threshold distance. Preferably, in a case in which the difference determination means determines that the difference is greater than the first threshold distance, the pan/tilt control means controls the pan/tilt means such that the camera is rotated by the third amount of rotation as a new amount of controlled rotation and a third designated object displayed at the second position is displayed at the target position, regardless of a determination result of the determination means. With this configuration, in a case in which the difference is greater than the first threshold distance, the third designated object displayed at the second position can be displayed at the target position.

Preferably, the averaging means increases a weight for the second position as the first time increases and performs the weighted averaging for the second position and the third position. It is considered that, as the first designated object becomes closer to the target position, the accuracy of the second position increases. Therefore, as the first designated object becomes closer to the target position, the weight for the second position becomes larger, which makes it possible to display an appropriate object at the target position.

Preferably, the imaging system further includes distance measurement means for measuring a distance between the camera and the third designated object displayed at the second position. Preferably, the averaging means increases the weight for the second position as the measured distance is reduced and performs the weighted averaging for the second position and the third position. It is considered that, as the distance to the third designated object is reduced, a difference in parallax caused by the rotation of the camera increases, which causes a reduction in the accuracy of the first position. Therefore, as the distance to the third designated object is reduced, the weight for the second position increases, which makes it possible to display an appropriate object at the target position.

Preferably, the imaging system further includes moving direction acquisition means for acquiring a moving direction of the first designated object from the first position to the target position on the display screen. Preferably, the averaging means decomposes a difference between the second position and the third position into a parallel component that is parallel to the moving direction and a vertical component that is perpendicular to the moving direction, sets a weight for the third position for the parallel component to be greater than a weight for the third position for the vertical component, and performs the weighted averaging for the second position and the third position. It is considered that the accuracy of the second position in the direction parallel to the moving direction is lower than that in the direction perpendicular to the moving direction. Therefore, the weight for the third position for parallel component is set to be greater than that for the vertical component, which makes it possible to display an appropriate object at the target position.

Preferably, the time measurement means measures a second time until a plurality of positions on the display screen are designated after the first position is designated. Preferably, the determination means determines whether the second time is shorter than the first threshold time. Preferably, the acquisition means acquires a fifth position which is a position of the first designated object on the display screen when the plurality of positions are designated. Preferably, the averaging means performs the simple averaging or the weighted averaging for the plurality of positions and the fifth position to acquire a sixth position. Preferably, the second conversion means converts a difference between the sixth position and the target position into a fourth amount of rotation which is an amount of rotation by the pan/tilt means.

Preferably, in a case in which the determination means determines that the second time is shorter than the first threshold time, the pan/tilt control means controls the pan/tilt means such that the camera is rotated by the fourth amount of rotation as a new amount of controlled rotation and a fourth designated object displayed at the sixth position is displayed at the target position. With this configuration, even in a case in which a plurality of positions on the display screen are designated within time shorter than the first threshold time, it is possible to display an appropriate object at the target position.

Preferably, the designation receiving means includes a touch panel that enables a user to designate an arbitrary position on the display screen with a touch operation. This aspect is suitable for an imaging system in which a touch panel is applied to designation receiving means.

Preferably, the target position is a position of a center of the display screen. This aspect is suitable for an imaging system in which the target position is set to the position of the center of the display screen and a designated object is centered.

Preferably, the imaging system further includes a remote camera and a portable terminal. Preferably, at least the display means and the designation receiving means are provided in the portable terminal and at least the camera and the pan/tilt means are provided in the remote camera. Preferably, each of the remote camera and the portable terminal includes communication means for performing communication. With this configuration, the camera of the remote camera can be controlled by the designation receiving means of the portable terminal such that a captured image is displayed on the display means of the portable terminal.

In order to achieve the object, an aspect of an imaging control method includes: a pan/tilt step of rotating a camera that acquires image data in a pan direction and a tilt direction perpendicular to the pan direction, using pan/tilt means; a display step of displaying the image data on a display screen; a designation receiving step of receiving an arbitrary position designated by a user on the display screen; a first conversion step of, in a case in which a first position on the display screen is designated, converting a difference between the first position on the display screen and a target position on the display screen into a first amount of rotation which is an amount of rotation by the pan/tilt means; a pan/tilt control step of controlling the pan/tilt means such that the camera is rotated by the first amount of rotation as an amount of controlled rotation and a first designated object displayed at the first position is displayed at the target position; a time measurement step of measuring a first time until a second position on the display screen is designated after the first position is designated; a determination step of determining whether the first time is shorter than a first threshold time; an acquisition step of acquiring a third position which is a position of the first designated object on the display screen when the second position is designated; an averaging step of performing simple averaging or weighted averaging for the second position and the third position to acquire a fourth position; and a second conversion step of converting a difference between the fourth position and the target position into a second amount of rotation which is an amount of rotation by the pan/tilt means. In a case in which it is determined in the determination step that the first time is shorter than the first threshold time, in the pan/tilt control step, the pan/tilt means is controlled such that the camera is rotated by the second amount of rotation as a new amount of controlled rotation and a second designated object displayed at the fourth position is displayed at the target position.

According to this aspect, simple averaging or weighted averaging is performed for the second position and the position of the first designated object on the display screen when the second position is designated to acquire the fourth position and the difference between the fourth position and the target position is converted into the second amount of rotation which is the amount of rotation by the pan/tilt means. In a case in which the determination means determines that the first time until the second position is designated after the first position is designated is shorter than the first threshold time, the camera is rotated by the second amount of rotation as a new amount of controlled rotation and the second designated object displayed at the fourth position is displayed at the target position. Therefore, it is possible to improve operability in a case in which a desired object is designated.

According to the invention, it is possible to improve operability in a case in which a desired object is designated.

BRIEF DESCRIPTION OF THE DRAWINGS

FIG. 1 is an external perspective view illustrating an example of an imaging system according to this embodiment.

DESCRIPTION OF THE PREFERRED EMBODIMENTS

Figure 2:
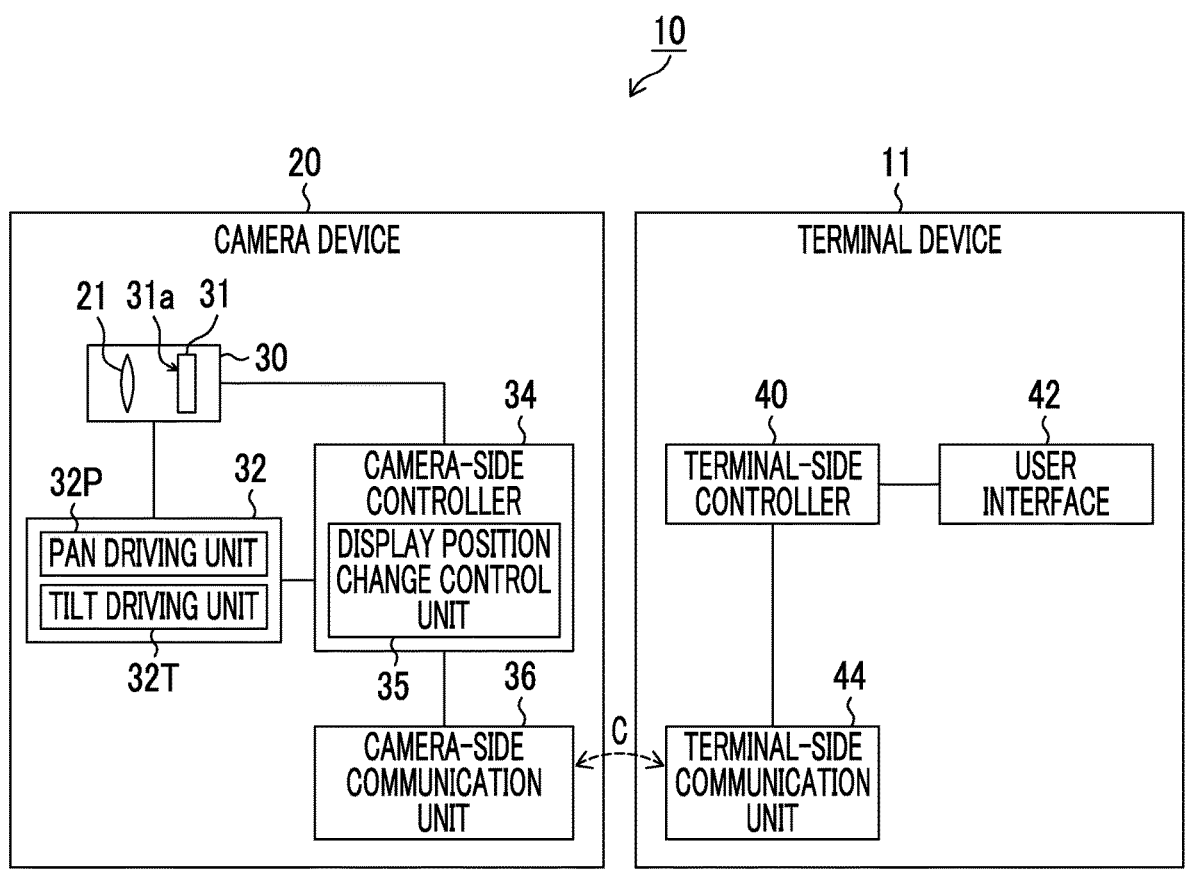
FIG. 2 is a block diagram illustrating an example of the configuration of the imaging system.

Hereinafter, preferred embodiments of the invention will be described with reference to the accompanying drawings.

First Embodiment

[Configuration of Imaging System]

FIG. 1 is an external perspective view illustrating an example of an imaging system 10 according to a first embodiment. As illustrated in FIG. 1, the imaging system 10 includes a terminal device 11 that has the form of a smartphone-type portable terminal and a camera device 20 that has the form of a pan/tilt remote camera and is connected to the terminal device 11 so as to communicate with the terminal device 11.

In the camera device 20, a holding portion 25 including a gear 26 and an imaging optical system 21 attached to the holding portion 25 are fixed to a base 23 that is provided on a device main body 22. The base 23 is provided so as to be rotatable on the Z-axis which is the axis of the vertical direction of the device main body 22 and a pan operation on the Z-axis is performed by a pan driving unit 32P (see FIG. 2). The gear 26 is provided on the same axis as the X-axis which is the axis of the horizontal direction perpendicular to the vertical direction. Driving force is transmitted from a tilt driving unit 32T (see FIG. 2) through the gear 26 to rotate the imaging optical system 21 in the vertical direction such that the imaging optical system 21 is tilted. The imaging optical system 21, the holding portion 25 (gear 26), and the base 23 are covered by a dome cover 24 that is a dustproof and drip-proof cover. In FIG. 1, the optical axis of the imaging optical system 21 is represented by letter "L".

A housing 12 of the terminal device 11 includes, for example, a touch panel 15, an operation button 16, a speaker 17, a microphone 18, and a terminal camera 19.

The touch panel 15 is configured such that a user performs a touch operation to designate an arbitrary position on a display screen. The touch panel 15 includes a display 13 (an example of the display screen) that displays various kinds of information and captured image data transmitted from the camera device 20 and an operation panel 14 of which the entire surface is transparent and which overlaps the display 13 and function as a command receiving unit receiving commands from the user. The touch panel 15 is configured such that the coordinates of a display position of the display 13 are associated with the coordinates of an operation position of the operation panel 14 and the operation panel 14 can detect an operation position of the display 13 to receive an arbitrary position designated by the user on the display screen. In the following description, all of the display operation of the display 13 and the command receiving operation of the operation panel 14 are referred to as an operation of the touch panel 15.

The operation button 16 functions as the command receiving unit that receives commands from the user together with the touch panel 15. The user can operate the terminal device 11 and the camera device 20 connected to the terminal device 11 through the touch panel 15 and the operation button 16. The speaker 17 and the microphone 18 function as a calling unit. The user can talk with the user of another telephone through the speaker 17 and the microphone 18. The terminal camera 19 can capture an image in response to a command from the user through the touch panel 15 or the operation button 16.

The user can control the operation of the camera device 20, using the terminal device 11. For example, the user can use the terminal device 11 to transmit a captured image from the camera device 20 to the terminal device 11 such that the captured image is displayed on the touch panel 15 or to change the imaging direction (the direction of the optical axis L of the imaging optical system 21) of the camera device 20.

FIG. 2 is a block diagram illustrating an example of the configuration of the imaging system 10.

The camera device 20 is a camera that continuously captures an image of an object and outputs a live view image of an object image. The camera device 20 includes an imaging unit 30, an imaging direction adjustment unit 32, a camera-side communication unit 36, and a camera-side controller 34 that controls the overall operation of these units.

The imaging unit 30 includes the imaging optical system 21 and an imaging element 31. The imaging optical system 21 includes, for example, a zoom lens, a focus lens, and a stop which are not illustrated in the drawings and is driven by a driving unit (not illustrated) to perform zooming, focusing, and the adjustment of the amount of incident light. The imaging element 31 is provided in a stage behind the imaging optical system 21 and receives object light through the imaging optical system 21. The imaging element 31 has an imaging surface 31a on which a plurality of light receiving elements (not illustrated) are arranged in a matrix. Object light that is incident on the imaging surface 31a is focused on a light receiving surface and is converted into an electric signal by each light receiving element. The imaging unit 30 outputs captured image data on the basis of the electric signal. The imaging unit 30 can periodically capture images and output captured image data under the control of the camera-side controller 34.

The imaging direction adjustment unit 32 (an example of pan/tilt means) is a pan/tilt mechanism including the pan driving unit 32P and the tilt driving unit 32T, in addition to the base 23, the holding portion 25, and the gear 26 illustrated in FIG. 1, and can adjust the imaging direction of the imaging unit 30. The imaging direction adjustment unit 32 is controlled by the camera-side controller 34. For example, in a case in which it is necessary to change the imaging direction to the horizontal direction, the imaging direction adjustment unit 32 pans the imaging unit 30 such that the imaging direction is changed to the horizontal direction by the necessary amount of movement under the control of the camera-side controller 34 (an example of a pan/tilt step). Similarly, in a case in which it is necessary to change the imaging direction to the vertical direction, the imaging direction adjustment unit 32 tilts the imaging unit 30 such that the imaging direction is changed to the vertical direction by the necessary amount of movement under the control of the camera-side controller 34 (an example of the pan/tilt step).

The camera-side communication unit 36 (an example of communication means) is connected to the camera-side controller 34, communicates with the terminal device 11 (particularly, a terminal-side communication unit 44 which will be described below) (see letter "C" in FIG. 2), transmits data from the camera device 20 to the terminal device 11, and receives data transmitted from the terminal device 11 to the camera device 20. That is, the camera-side communication unit 36 transmits data sent from the camera-side controller 34 to the terminal device 11 (terminal-side communication unit 44), receives data transmitted from the terminal device 11 (terminal-side communication unit 44), and transmits the received data to the camera-side controller 34.

Data transmitted between the camera device 20 (camera-side communication unit 36) and the terminal device 11 (terminal-side communication unit 44) is not particularly limited. For example, various commands or captured image data acquired by the imaging unit 30 can be transmitted and received between the camera device 20 and the terminal device 11 if necessary.

In contrast, the terminal device 11 that can be connected to the camera device 20 includes a user interface 42, the terminal-side communication unit 44, and a terminal-side controller 40 that controls the overall operation of the terminal device 11.

The terminal-side communication unit 44 (an example of communication means) can communicate with the camera-side communication unit 36. The terminal-side communication unit 44 receives data transmitted from the camera-side communication unit 36 and transmits the received data to the terminal-side controller 40. In addition, the terminal-side communication unit 44 transmits data sent from the terminal-side controller 40 to the camera-side communication unit 36. A communication method between the terminal-side communication unit 44 and the camera-side communication unit 36 is not particularly limited. The communication method may be a wired connection method or a wireless connection method. For example, the following communication method can be used: a communication method based on a wireless local area network (LAN) according to, for example, an IEEE802.11a/b/g/n standard defined by The Institute of Electrical and Electronics Engineers, Inc. (IEEE); or a communication method based on near field communication according to, for example, a Bluetooth (registered trademark) standard.

The terminal-side controller 40 is connected to the user interface 42 and the terminal-side communication unit 44 and performs various kinds of control on the basis of data such as commands transmitted from the user interface 42. In addition, the terminal-side controller 40 controls the terminal-side communication unit 44 such that data is transmitted to the camera-side communication unit 36, if necessary. Furthermore, the terminal-side controller 40 functions as display means for displaying an image on the touch panel 15.

The user interface 42 is an interface with the user of the terminal device 11. Therefore, for example, the user interface 42 includes the touch panel 15 that can display an image, the touch panel 15 and the operation button 16 that receive commands from the user, the speaker 17 that provides a voice to the user, and the microphone 18 acquires a voice.

[Configuration of Display Position Change Control Unit]

Figure 3:
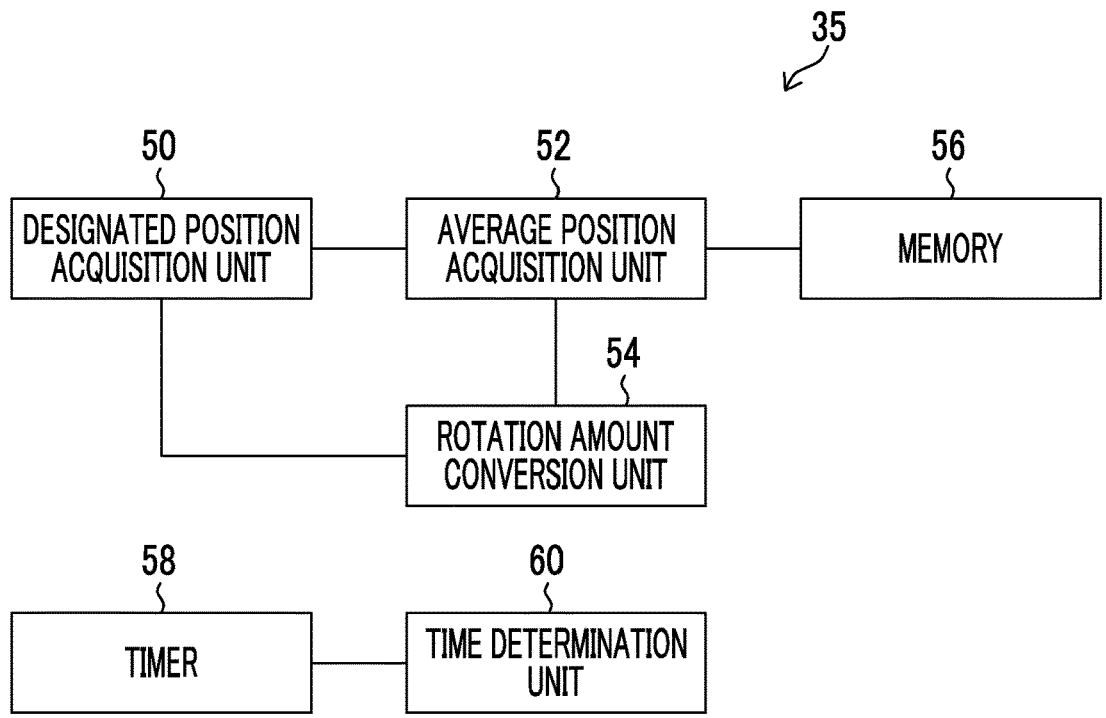
FIG. 3 is a block diagram illustrating an example of a display position change control unit.
Figure 4:
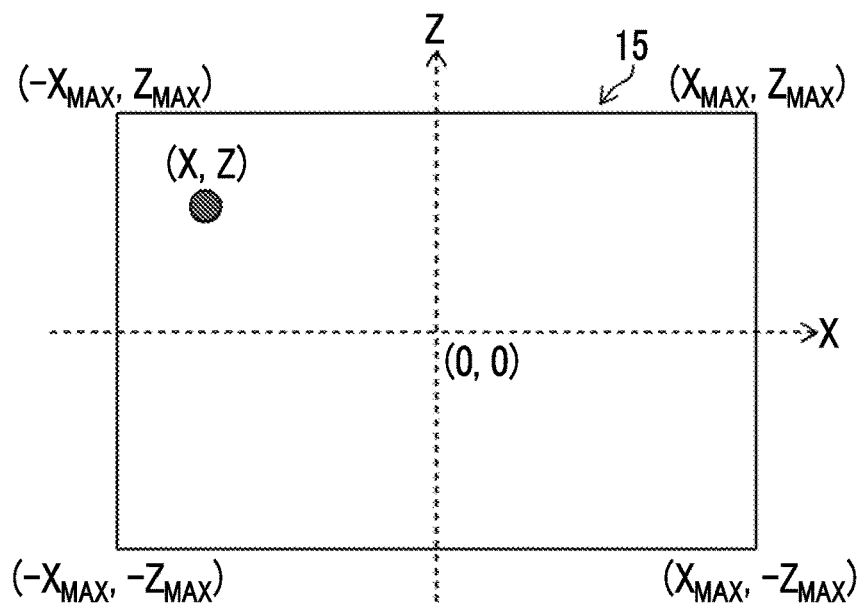
FIG. 4 is a diagram illustrating the definition of the coordinates of a display screen of a touch panel.

FIG. 3 is a block diagram illustrating an example of a display position change control unit 35 of the camera-side controller 34. The display position change control unit 35 includes a designated position acquisition unit 50 that acquires a position designated by the touch panel 15, an average position acquisition unit 52 that acquires an average position of the designated position, a rotation amount conversion unit 54 that converts a difference between the designated position or the average position and a target position into the amount of rotation of the imaging unit 30 by the imaging direction adjustment unit 32, a memory 56 that stores a history of a designation operation position, a timer 58 that measures time, and a time determination unit 60 that compares the time measured by the timer 58 with a threshold time. The operation of each block will be described in detail below.

[Angle-of-View Change Function]

In the following description, for the display screen of the touch panel 15, the horizontal axis is defined as the X-axis, the vertical axis is defined as the Z-axis, the coordinates of the center are defined as the origin (0, 0), the coordinates of four corners are defined as ($X_{MAX}$, $Z_{MAX}$), ($-X_{MAX}$, $Z_{MAX}$), ($-X_{MAX}$, $-Z_{MAX}$), and ($X_{MAX}$, $-Z_{MAX}$), and the coordinates of an arbitrary position on the screen are defined as (X, Z).

Figure 5:
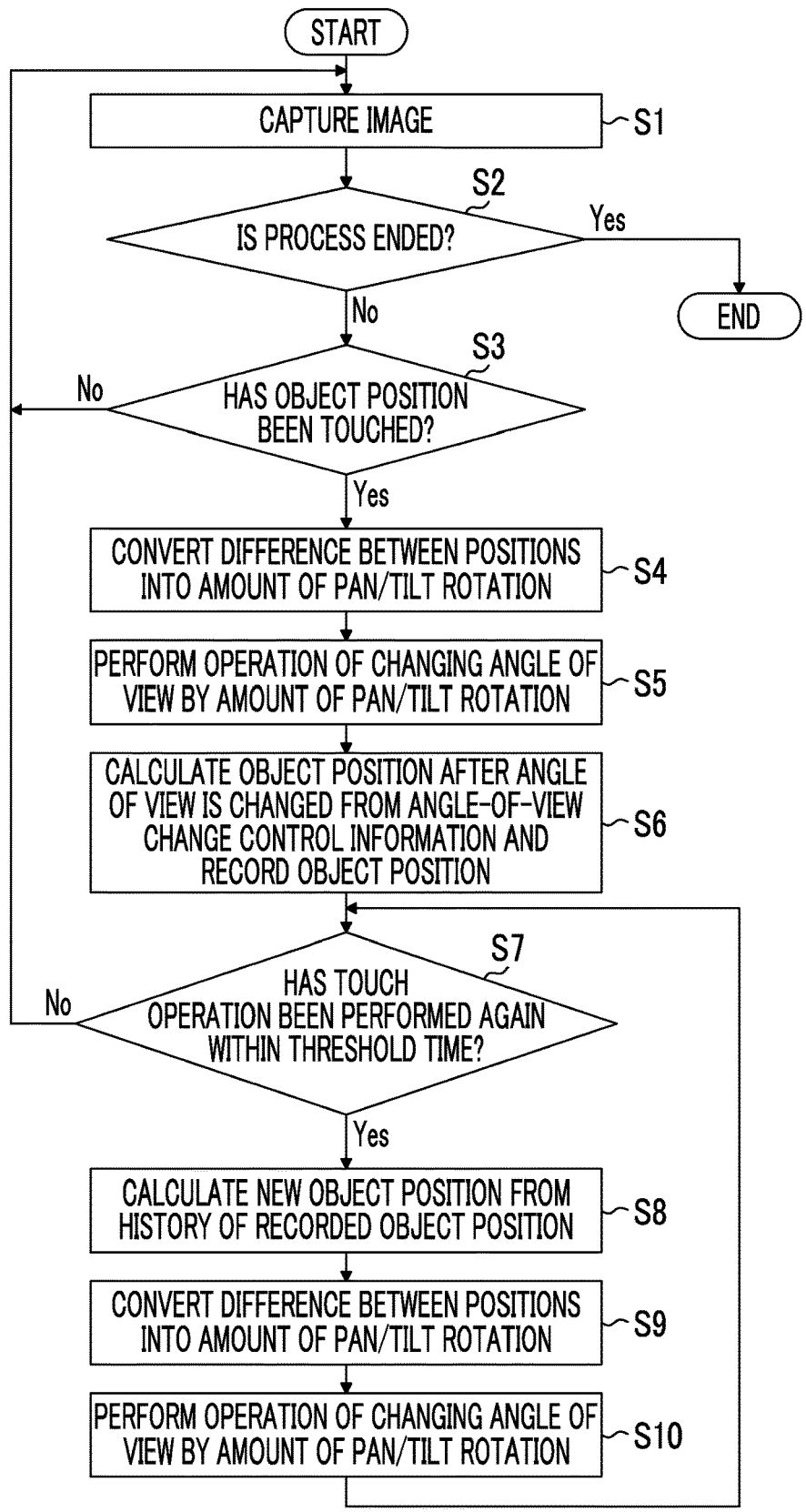
FIG. 5 is a flowchart illustrating the process of an angle-of-view change function according to a first embodiment.

The imaging system 10 has an angle-of-view change function that changes the angle of view of the imaging unit 30 such that an object displayed at an arbitrary position of the touch panel 15 is displayed at a predetermined target position of the touch panel 15. FIG. 5 is a flowchart illustrating the process (an example of an imaging control method) of the angle-of-view change function according to the first embodiment. Here, a touch centering function in which means for designating an object is a touch operation for the touch panel 15 and the target position is the origin (0, 0) that is the center of the touch panel 15 will be described as an example of the angle-of-view change function.

First, the camera device 20 starts to capture a live view image in response to an imaging start command from the touch panel 15 or the operation button 16 of the terminal device 11. The imaging start command is input to the camera-side controller 34 through the terminal-side communication unit 44 and the camera-side communication unit 36. The camera-side controller 34 directs the imaging unit 30 to start the capture of an image. Then, the imaging element 31 starts to output an image signal.

Figure 6A:
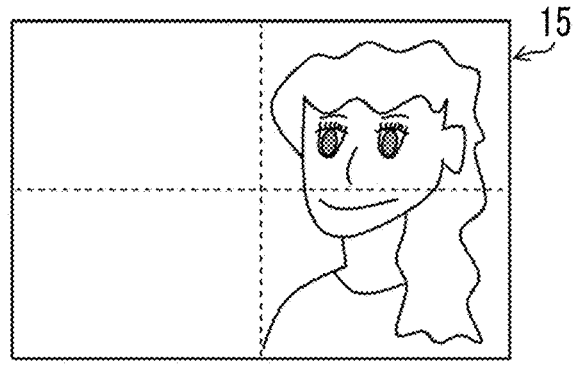
FIGS. 6(a)-6(d) are diagrams illustrating the angle-of-view change function according to the first embodiment.

The camera-side controller 34 acquires captured image data output from the imaging unit 30 and transmits the captured image data to the terminal device 11 through the camera-side communication unit 36. In the terminal device 11, the terminal-side communication unit 44 receives the captured image data and outputs the captured image data to the terminal-side controller 40. The terminal-side controller 40 displays the captured image data as a live view image on the touch panel 15 (Step S1, an example of a display step). FIG. 6(a) is a diagram illustrating an example of the live view image displayed on the touch panel 15.

In the following description, for the exchange of various commands or various kinds of data between the terminal device 11 and the camera device 20, the description of portions related to communication will be omitted.

Then, the camera-side controller 34 determines whether to end the capture of the live view image (Step S2). In a case in which an imaging end command is input through the touch panel 15 or the operation button 16, the camera-side controller 34 ends the capture of the live view image.

Figure 6B:
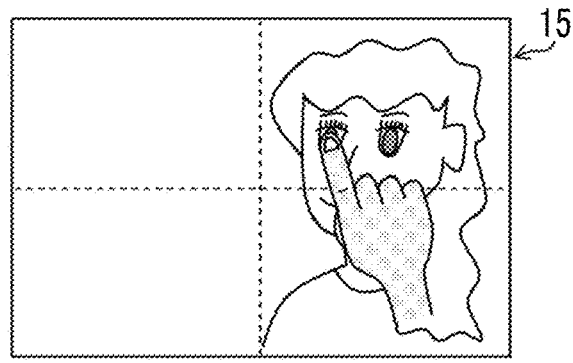

In a case in which the imaging end command is not input, the display position change control unit 35 determines whether a touch operation has been performed for the touch panel 15 (Step S3). As illustrated in FIG. 6(b), the touch operation is performed by tapping an arbitrary position (an example of an arbitrary position on the display screen) where the object to be centered is displayed on the live view image displayed on the touch panel 15 (an example of designation receiving means) (an example of a designation receiving step). In a case in which two positions are tapped at the same time, the operation is not regarded as a touch operation for changing the angle of view, but is regarded as an operation for another function.

In a case in which the touch operation has not been performed, the process returns to Step S1 and the same process as described above is repeated. On the other hand, in a case in which the touch operation (initial touch operation) has been performed, the camera-side controller 34 directs the timer 58 to start to measure the time elapsed since the touch operation. In addition, the camera-side controller 34 directs the designated position acquisition unit 50 to acquire the coordinates of the touch position (an example of an initial touch operation position and a first position) and directs the rotation amount conversion unit 54 (an example of first conversion means and an example of third conversion means) to convert a difference between the initial touch operation position and the position of the origin which is the target position into the amount of rotation of the imaging unit 30 in the pan direction and the amount of rotation of the imaging unit 30 in the tilt direction (an example of the amount of pan/tilt rotation, an example of a first amount of rotation, and an example of a third amount of rotation) (Step S4, an example of a first conversion step).

Figure 6C:
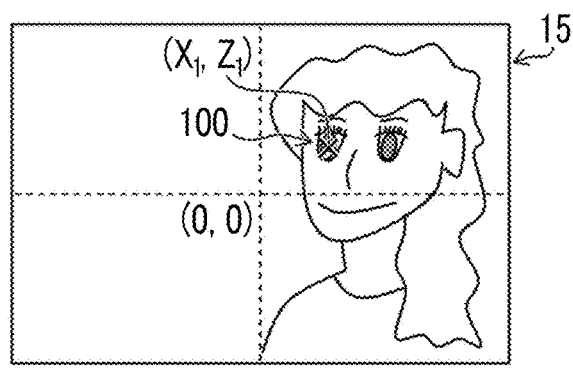

Here, it is assumed that the coordinates of a touch position (an example of the first position) on the touch panel 15 are ($X_1$, $Z_1$) and an object 100 which is the right eye of a person is displayed at the position corresponding to the coordinates ($X_1$, $Z_1$) as illustrated in FIG. 6(c). The converted amount of pan/tilt rotation corresponds to the amount of rotation of the imaging unit 30 (the amount of movement of the imaging unit 30 by the pan driving unit 32P and the tilt driving unit 32T in the imaging direction) for displaying the object 100 (an example of a first designated object) at the position of the origin (0, 0) which is the target position on the touch panel 15.

Figure 6D:
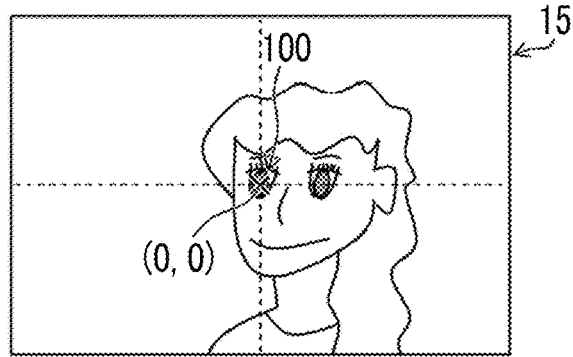
Figure 7A:
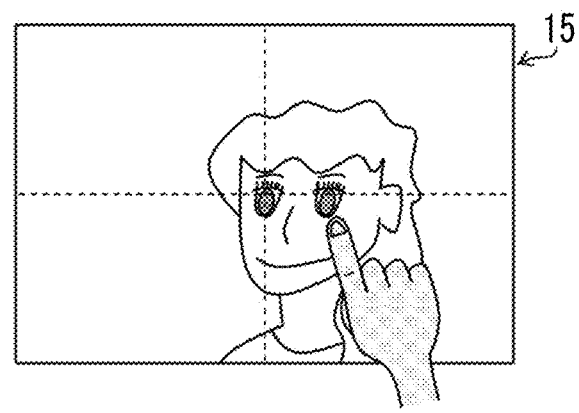
FIGS. 7(a)-7(d) are diagrams illustrating the angle-of-view change function according to the first embodiment.
Figure 7B:
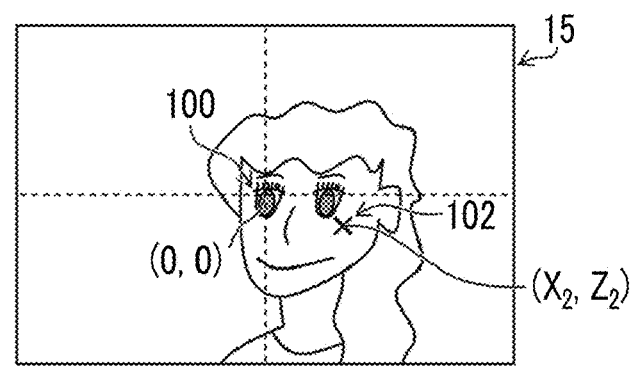
Figure 7C:
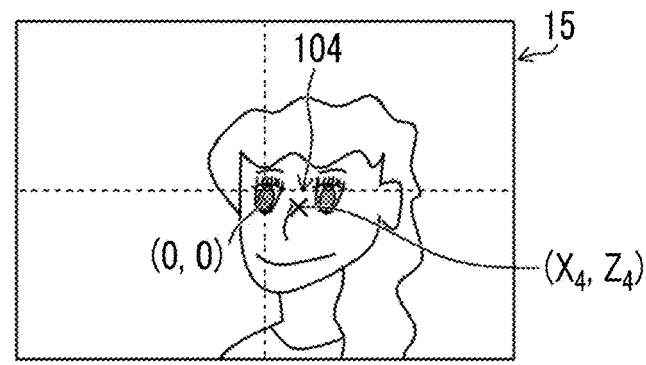
Figure 7D:
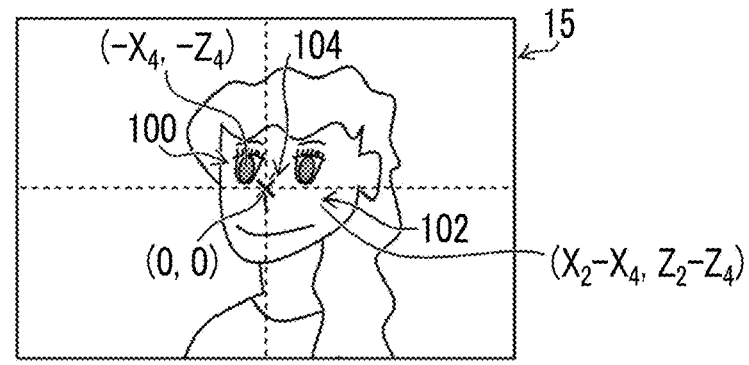

In addition, the camera-side controller 34 controls the imaging direction adjustment unit 32 (an example of pan/tilt control means), using the amount of pan/tilt rotation converted in Step S4 as the amount of controlled rotation, such that the imaging unit 30 is rotated (the angle of view of the imaging unit 30 is changed) by the amount of pan/tilt rotation (Step S5, an example of a pan/tilt control step). That is, the optical axis L of the camera is moved from the current position to the position of the object 100. Then, as illustrated in FIG. 6(d), the object 100 displayed at the position corresponding to the coordinates ($X_1$, $Z_1$) of the touch panel 15 is displayed at the position of the origin (0, 0) of the touch panel 15.

Then, the display position change control unit 35 calculates the position of the object 100 after the angle of view is changed from the amount of controlled rotation (angle-of-view change control information) in Step S5 and records the calculated position of the object 100 in the memory 56 (Step S6). Here, since the object 100 is moved to the position of the origin (0, 0) of the touch panel 15 by the angle-of-view change operation, the origin (0, 0) is recorded as the position of the object 100 after the angle of view is changed. The position of the object 100 after the angle of view is changed may not be calculated as the coordinates of the touch panel 15, but may be calculated as the amount of rotation from the initial position of motors (not illustrated) in the pan driving unit 32P and the tilt driving unit 32T or may be calculated as the direction of the optical axis L of the camera.

Then, the imaging unit 30 captures a live view image and the live view image is displayed on the touch panel 15. Then, the time determination unit 60 determines whether a touch operation has been performed for the touch panel 15 again within time shorter than the threshold time (an example of a first threshold time) (Step S7, an example of a determination step). Here, the timer 58 measures the time (an example of a first time) until the touch operation is performed for the touch panel 15 again after the initial touch operation (an example of a time measurement step) and the time determination unit 60 compares the measured time with the threshold time to perform the determination. For example, it is assumed that the threshold time is 1 second.

In this embodiment, the process performed after the touch operation varies depending on whether the second and subsequent touch operations have been performed within the time shorter than the threshold time since the initial touch operation. In a case in which the timer 58 (an example of time measurement means) measures 1 second which is the threshold time (an example of a first threshold time or more), the process proceeds to Step S1 and the same process as described above is performed again. Therefore, in a case in which the touch operation has been performed again since the threshold time has elapsed, the touch operation is regarded as the initial touch operation and the angle-of-view change operation is performed by the above-mentioned process.

On the other hand, in a case in which the touch operation has been performed again before the timer 58 measures 1 second, the angle-of-view change operation corresponding to the history of the touch operation is performed. For the angle-of-view change operation, first, the display position change control unit 35 directs the designated position acquisition unit 50 to acquire the coordinates of the position which has been touched again (an example of a second touch operation position and a second position) on the touch panel 15. Then, the display position change control unit 35 directs the average position acquisition unit 52 (an example of acquisition means) acquires the position (an example of a third position) of the object 100 when the second touch operation is performed (an example of when the second position is designated) (an example of an acquisition step). Here, the average position acquisition unit 52 reads out the position of the object 100 recorded in the memory 56 and acquires the position of the object 100. Then, the display position change control unit 35 directs the average position acquisition unit 52 (an example of averaging means) to perform simple averaging or weighted averaging for the position of the object 100 and the second touch operation position to calculate an average position (an example of a fourth position) (Step S8, an example of an averaging step).

FIG. 7(*a*) is a diagram illustrating an aspect in which the user touches an arbitrary position where the object to be centered is displayed as the second touch operation position in the live view image illustrated in FIG. 6(*d*). The designated position acquisition unit 50 acquires the coordinates of the second touch operation position. Here, it is assumed that the coordinates of the second touch operation position are $(X_2, Z_2)$ and an object 102 (an example of a third designated object) which is the left cheek of a person is displayed at the position corresponding to the coordinates $(X_2, Z_2)$ as illustrated in FIG. 7(*b*).

The average position acquisition unit 52 calculates the coordinates $(X_4, Z_4)$ of an average position which is the position of a new designated object from the coordinates of the current position (the position when the second touch operation is performed) of the object 100 displayed at the initial touch operation position on the touch panel 15 and the coordinates $(X_2, Z_2)$ of the second touch operation position. Here, assuming that the coordinates of the current position of the object 100 displayed at the initial touch operation position are $(X_3, Z_3)$, the coordinates $(X_4, Z_4)$ of the position of the new designated object can be calculated by the following Expressions 1 and 2.

$$X_4=(X_2+W_X\times X_3)/(1+W_X) \quad \text{(Expression 1)}$$

$$Z_4=(Z_2+W_Z\times Z_3)/(1+W_Z) \quad \text{(Expression 2)}$$

In Expressions 1 and 2, $W_X$ and $W_Z$ are averaging process coefficients ($W_X>0$, $W_Z>0$) that determine weights for the current position of the object displayed at the initial touch operation position and the second touch operation position in the X direction (pan direction) and the Z direction (tilt direction).

Assuming that $W_X=1$ and $W_Z=1$ are established, the coordinates $(X_4, Z_4)$ of the average position are the simple average of the current position of the object displayed at the initial touch operation position and the second touch operation position. In addition, $W_X$ and $W_Z$ can be set to values less than 1 to increase the weight for the second touch operation position. On the contrary, $W_X$ and $W_Z$ can be set to values greater than 1 to increase the weight for the position of the object at the time of the second touch operation, that is, the initial touch operation position. In this embodiment, as the time elapsed from the initial touch operation to the second touch operation becomes longer, the values of $W_X$ and $W_Z$ applied become smaller. Therefore, as the time elapsed increases, the weight for the second touch operation position increases. It is considered that the time elapsed increases, that is, as the object 100 becomes closer to the target position, the accuracy of the second touch operation position increases. Therefore, the weight for the touch operation position can be increased to display an appropriate object at the target position.

In this embodiment, since the coordinates of the current position of the object 100 read out from the memory 56 are (0, 0), the coordinates $(X_4, Z_4)$ of the average position are calculated using $X_3=0$ and $Z_3=0$. In the example illustrated in FIG. 7(*c*), an object 104 which is the nose of the person is displayed at the coordinates $(X_4, Z_4)$ of the average position. The object 104 displayed at the coordinates $(X_4, Z_4)$ of the average position is a new designated object (an example of a second designated object).

Returning to FIG. 5, after the average position is calculated, the rotation amount conversion unit 54 (an example of second conversion means) converts the difference between the average position and the position of the origin which is the target position into the amount of pan/tilt rotation (an example of a second amount of rotation) of the imaging unit 30 (Step S9, an example of a second conversion step). The amount of pan/tilt rotation corresponds to the amount of rotation of the imaging unit 30 for displaying the object 104 at the position of the origin (0, 0) which is the target position on the touch panel 15.

Then, the camera-side controller 34 controls the imaging direction adjustment unit 32, using the amount of pan/tilt rotation converted in Step S9 as the amount of controlled rotation, such that the angle of view of the imaging unit 30 is changed (Step S10). Then, as illustrated in FIG. 7(*d*), the object 104 displayed at the position corresponding to the coordinates $(X_4, Z_4)$ on the touch panel 15 is displayed at the position of the origin (0, 0) on the touch panel 15.

Then, returning to Step S7, it is determined whether the touch operation has been performed for the touch panel 15 again within time (second time) shorter than the threshold time since the initial touch operation. In a case in which a plurality of touch operations have been performed until the threshold time is measured, the angle-of-view change operation is performed such that the object displayed at the average position of the plurality of positions touched for the time is displayed at the target position.

In the example illustrated in FIG. 7(*d*), the position of the object 100 at the initial touch operation position is the position (an example of a fifth position) corresponding to the coordinates $(-X_4, -Z_4)$ on the touch panel 15 and the position of the object 102 at the second touch operation position is the position (one of a plurality of positions) corresponding to the coordinates $(X_2-X_4, Z_2-Z_4)$ on the touch panel 15. In a case in which a third touch operation is performed, the average position (an example of a sixth position) of two positions and the third touch operation position (one of a plurality of positions) may be calculated by simple averaging or weighted averaging. Then, the difference between the average position and the target position may be converted into the amount of pan/tilt rotation (an example of a fourth amount of rotation). Then, the object (an example of a fourth designated object) displayed at the average position may be displayed as a new object at the target position.

In addition, whenever the touch operation is performed within the time shorter than the threshold time since the initial touch operation, the timer 58 may start to measure time again from the beginning. In this case, in a case in which it is determined in Step S7 that the touch operation has been performed for the touch panel 15 again within the time shorter than the threshold time since the previous touch operation, the measurement of time by the timer 58 may be cleared and the timer 58 may start to measure the threshold time again.

As such, in this embodiment, in the object designation operation for displaying a desired object at a target position, in a case in which the designation operation has been performed again within the time shorter than the threshold time since the initial designation operation, the object displayed at the position designated again is not displayed at the target position, but the object at the position which has been subjected to the averaging process using the history of the designation operation position is displayed at the target position. Therefore, the designated position in a case in which a desired object is designated is stabilized and it is possible to improve operability.

In this embodiment, the display position change control unit 35 is provided in the camera-side controller 34. However, the display position change control unit 35 may be provided in the terminal-side controller 40. In this case, for example, necessary signals may be exchanged between the display position change control unit 35 and the imaging unit 30 or the imaging direction adjustment unit 32 through the terminal-side communication unit 44 and the camera-side communication unit 36. In addition, the blocks in the display position change control unit 35 may be dispersively provided in the camera-side controller 34 and the terminal-side controller 40.

In this embodiment, the user touches the touch panel 15 to designate an arbitrary position on the display screen. However, an aspect in which a cursor displayed on the touch panel 15 (display 13) may be moved to a desired position by the operation button 16 to designate a position may be used.

In addition, in the above description, the target position is the position of the center of the touch panel 15. However, the target position may be any position on the display screen of the touch panel 15. Furthermore, a configuration that enables the user to set the target position may be used.

Second Embodiment

An angle-of-view change function according to a second embodiment will be described. In this embodiment, in a case in which a touch operation has been performed again within a threshold time, it is determined whether the touch operation is performed in order to finely adjust an initial touch operation or in order to change the display position of another object at a separated position and the display position is appropriately changed.

Figure 8:
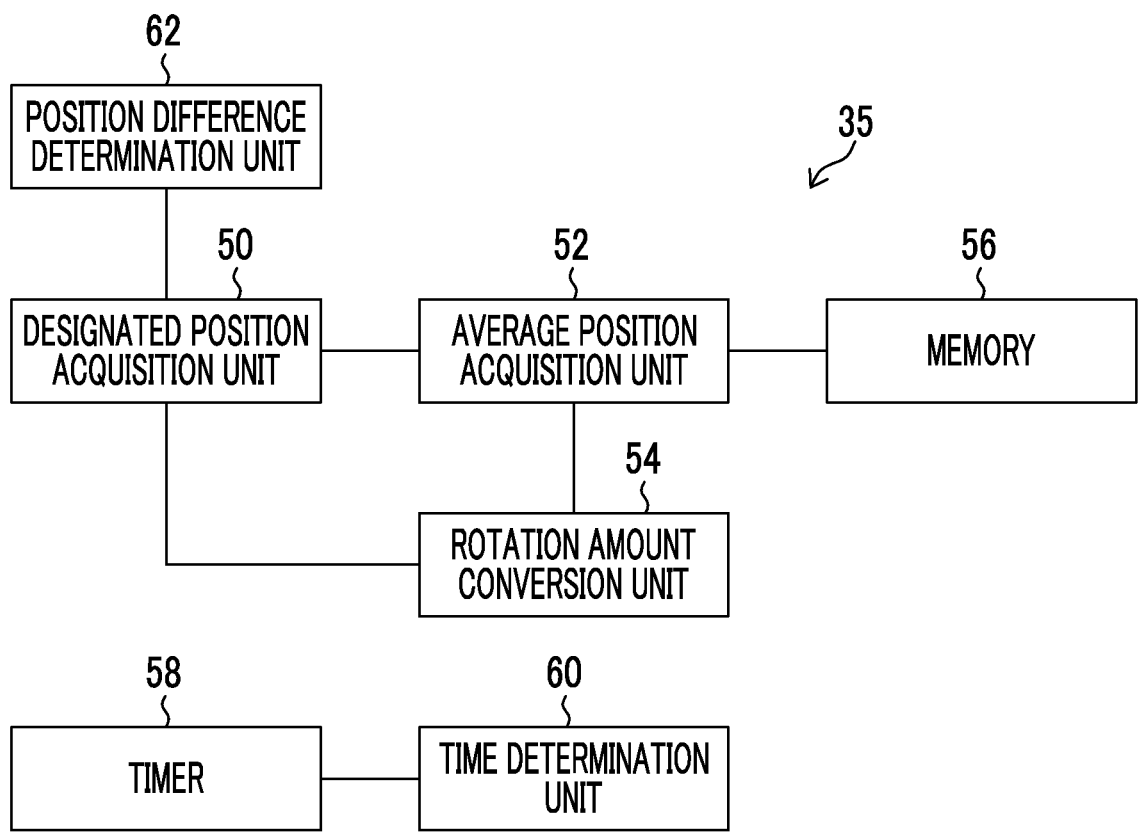
FIG. 8 is a block diagram illustrating an example of a display position change control unit according to a second embodiment.

FIG. 8 is a block diagram illustrating an example of a display position change control unit 35 according to the second embodiment. The display position change control unit 35 according to the second embodiment differs from the display position change control unit 35 according to the first embodiment in that it includes a position difference determination unit 62. The position difference determination unit 62 determines whether a difference (a distance on the display screen) between a designated position and a target position is less than a threshold distance $L_T$ (an example of a first threshold distance).

Figure 9:
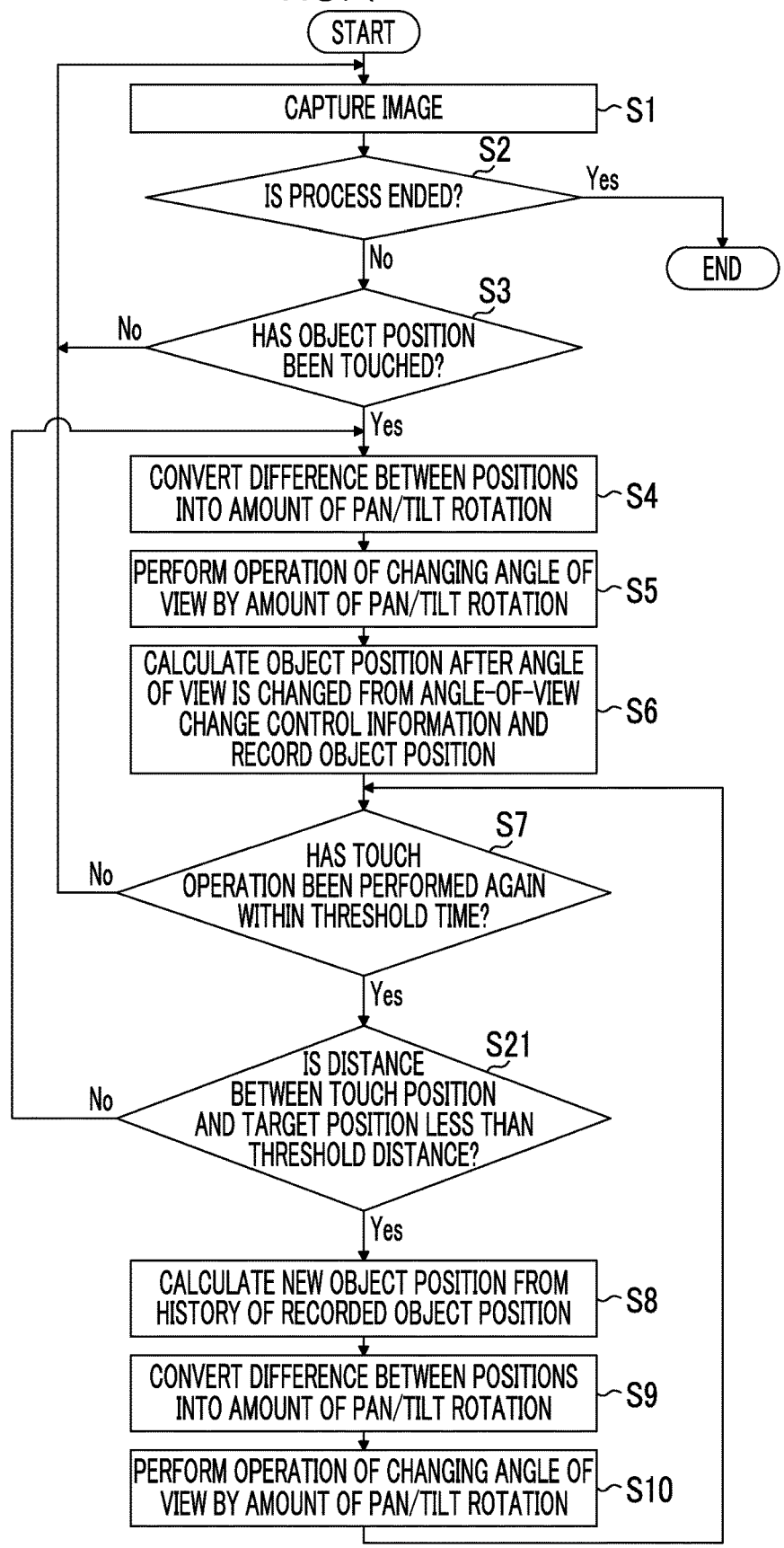
FIG. 9 is a flowchart illustrating the process of an angle-of-view change function according to the second embodiment.

FIG. 9 is a flowchart illustrating the process of an angle-of-view change function according to the second embodiment. The same processes as those in the flowchart illustrated in FIG. 5 are denoted by the same reference numerals and the detailed description thereof will not be repeated.

In this embodiment, in a case in which the time determination unit 60 determines that the touch operation has been performed again within the threshold time since the initial touch operation (Step S7), the position difference determination unit 62 (an example of difference determination means) determines whether the distance between the target position and the position touched again on the touch panel 15 is less than the threshold distance $L_T$ (Step S21). For example, assuming that the coordinates of the second touch operation position on the touch panel 15 is $(X_2, Z_2)$ and the coordinates of the target position is $(X_0, Z_0)$, the distance $L_P$ between the two positions on the touch panel 15 can be calculated by the following Expression 3.

$$L_P = \sqrt{(X_1-X_6)^2+(Z_2-Z_3)^2} \quad \text{(Expression 3)}$$

The position difference determination unit 62 compares the calculated distance $L_P$ with the threshold distance $L_T$.

In a case in which the distance $L_P$ is less than the threshold distance $L_T$, that is, in a case in which $L_P \le L_T$ is satisfied, it is determined that a touch operation position averaging process is preferable and the process proceeds to Step S8. Then, the angle-of-view change operation is performed such that a new object displayed at the average position is displayed at the target position (Steps S8 to S10).

On the other hand, in a case in which the distance $L_P$ is greater than the threshold distance $L_T$, that is, in a case in which $L_P > L_T$ is satisfied, it is determined that the user's intention is to display an object different from the object at the initial touch operation position at the target position and the process proceeds to Step S4. Then, the angle-of-view change operation is performed such that the object displayed at the second touch operation position is displayed at the target position (Steps S4 to S6). In this case, the timer 58 may start to measure time again from the beginning.

For example, the value of $X_{MAX} \div 2$ or $Z_{MAX} \div 2$ can be used as the threshold distance $L_T$.

As such, in a case in which the touch operation has been performed again and the touch operation position is far away from the target position, it is determined that the touch operation has been performed for a different object even though the touch operation has been performed within the time shorter than the threshold time since the initial touch operation (an example of the regardlessness of the determination result of the determination means) and the object is displayed at the target position. Therefore, it is possible to perform an appropriate angle-of-view change operation.

Third Embodiment

Figure 10:
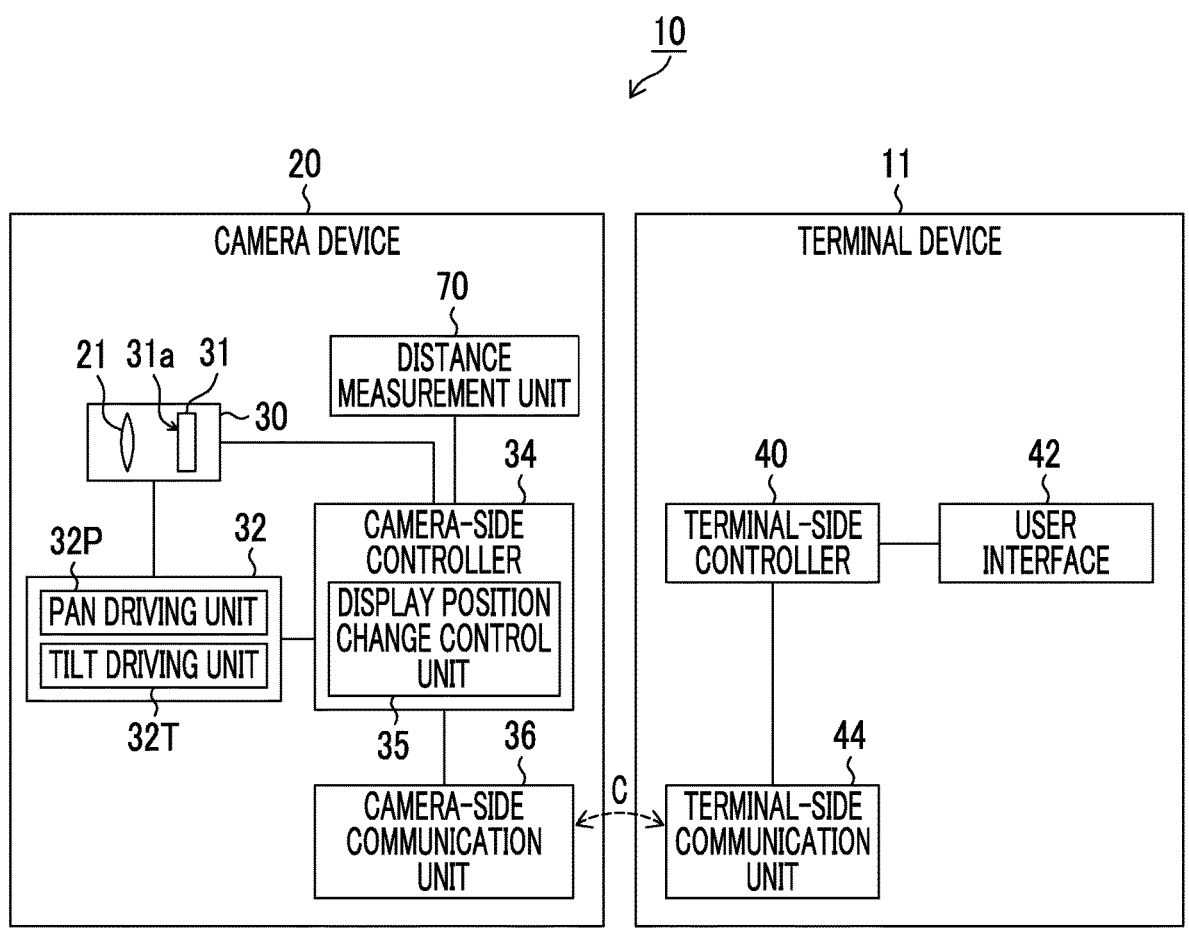
FIG. 10 is a block diagram illustrating an example of the configuration of an imaging system according to a third embodiment.

FIG. 10 is a block diagram illustrating an example of the configuration of an imaging system 10 according to a third embodiment. The imaging system 10 according to the third embodiment differs from the imaging system 10 illustrated in FIG. 2 in that the camera device 20 includes a distance measurement unit 70.

The distance measurement unit 70 is distance measurement means for measuring the distance from the camera device 20 to an object of the imaging unit 30 (an object displayed on the touch panel 15). A known technique, such as distance calculation means using the focal position of the focus lens (not illustrated) of the imaging optical system 21, distance estimation means for estimating the distance from the size of the face of an object in captured image data, distance measurement means using a stereo camera, or laser distance measurement means, can be applied as the distance measurement unit 70.

Figure 11:
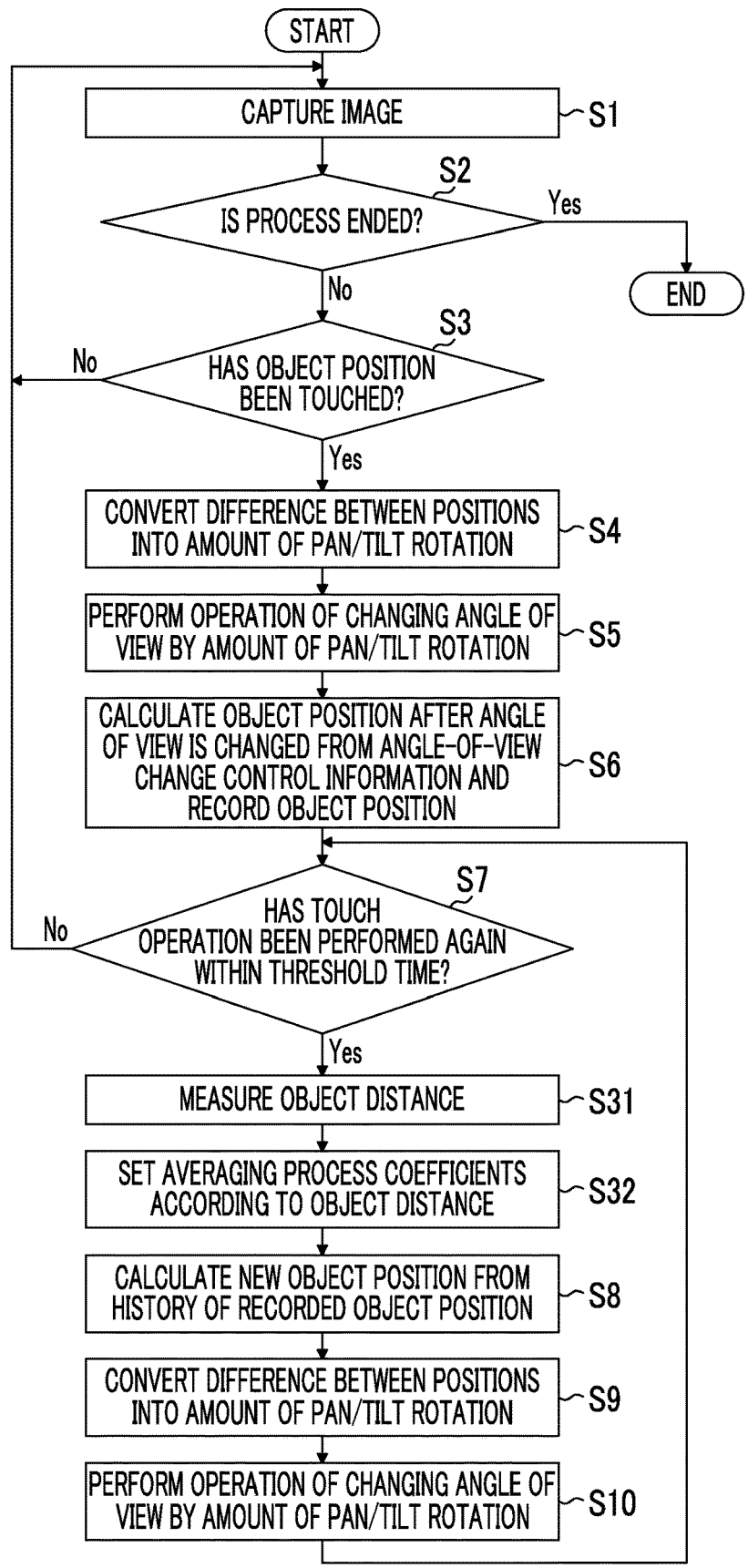
FIG. 11 is a flowchart illustrating the process of an angle-of-view change function according to the third embodiment.

FIG. 11 is a flowchart illustrating the process of an angle-of-view change function according to the third embodiment. The same processes as those in the flowchart illustrated in FIG. 5 are denoted by the same reference numerals and the detailed description thereof will not be repeated.

In this embodiment, in a case in which the time determination unit 60 determines that the touch operation has been performed again within the threshold time since the initial touch operation (Step S7), the camera device 20 measures an object distance D which is the distance between the camera device 20 and the object displayed at the position touched again on the touch panel 15, using the distance measurement unit 70 (Step S31). For example, in the example illustrated in FIG. 7(b), the object distance D between the camera device 20 and the object 102 is measured.

Then, the average position acquisition unit 52 sets averaging process coefficients according to the object distance D measured in Step S31 (Step S32). That is, the average position acquisition unit 52 sets $W_X$ and $W_Z$ in Expressions 1 and 2 according to the object distance D. Then, the average position acquisition unit 52 calculates an average position using the averaging process coefficients (Step S8).

In a case in which the object distance D is relatively short, parallax that occurs in association with the angle-of-view change operation is relatively large. Therefore, it is difficult to designate the exact position of the object before the angle of view is changed. As a result, the error of the initial touch operation position with respect to the position of a desired object is large. For this reason, the average position is calculated by weighted averaging in which, as the object distance D is reduced, a weight for the previous touch operation position decreases. As such, since the touch operation position averaging process is performed according to the object distance, it is possible to perform an appropriate angle-of-view change operation.

In this embodiment, the distance measurement unit 70 measures, as the object distance D, the distance between the camera device 20 and the object displayed at the position touched again on the touch panel 15. However, the distance between the camera device 20 and the object (for example, the object 100 illustrated in FIG. 7(b)) displayed at the initial touch operation position may be measured as the object distance D.

Fourth Embodiment

An angle-of-view change function according to a fourth embodiment will be described. In this embodiment, in a case in which the touch operation has been performed again during the operation of changing the angle of view of the imaging unit 30, a process of averaging a touch operation position corresponding to the direction in which the angle of view is changed (the direction in which an object moves on a display screen) is performed.

Figure 12:
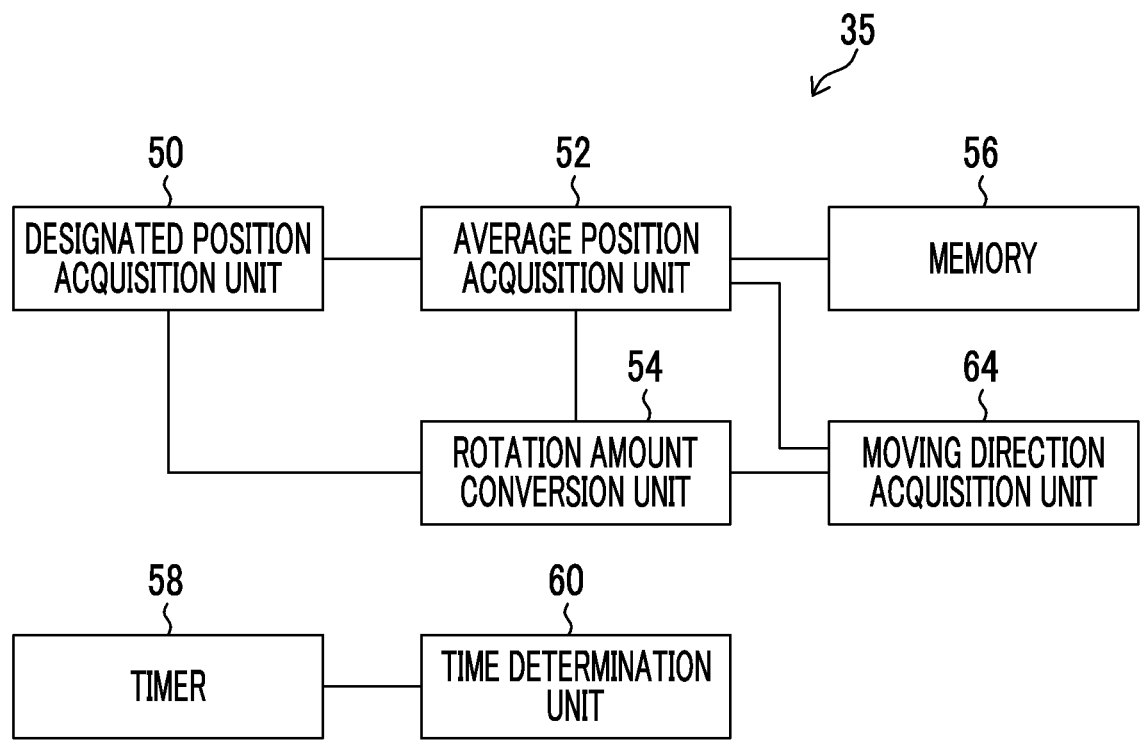
FIG. 12 is a block diagram illustrating an example of a display position change control unit according to a fourth embodiment.

FIG. 12 is a block diagram illustrating an example of a display position change control unit 35 according to the fourth embodiment. The display position change control unit 35 according to the fourth embodiment differs from the display position change control unit 35 according to the first embodiment in that it includes a moving direction acquisition unit 64. The moving direction acquisition unit 64 acquires the moving direction of an object on the display screen of the touch panel 15 by an angle-of-view change operation.

Figure 13:
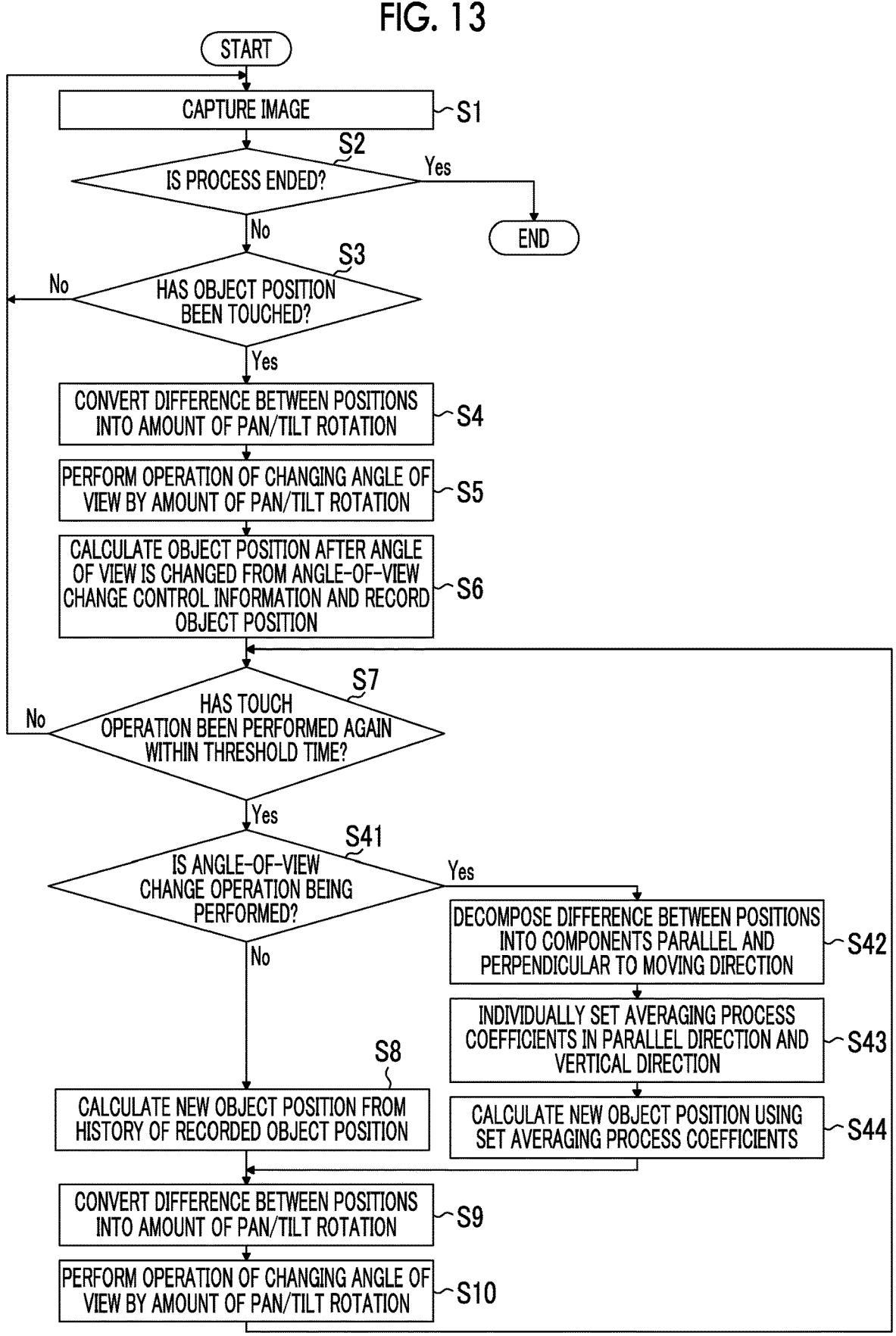
FIG. 13 is a flowchart illustrating the process of an angle-of-view change function according to the fourth embodiment.

FIG. 13 is a flowchart illustrating the process of the angle-of-view change function according to the fourth embodiment. The same processes as those in the flowchart illustrated in FIG. 5 are denoted by the same reference numerals and the detailed description thereof will not be repeated.

Figure 14A:
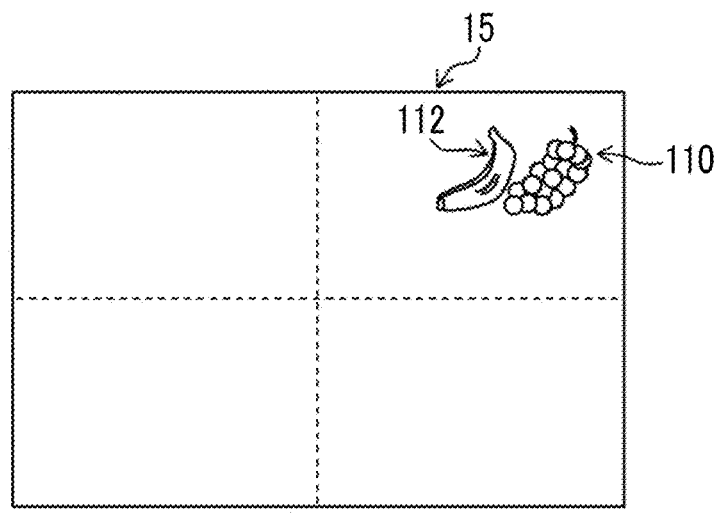
FIGS. 14(a)-14(c) are diagrams illustrating the angle-of-view change function according to the fourth embodiment.

First, the capture of a live view image starts (Step S1). Here, it is assumed that an object 110 and an object 112 are displayed as the live view image on the touch panel 15 as illustrated in FIG. 14(a).

Figure 14B:
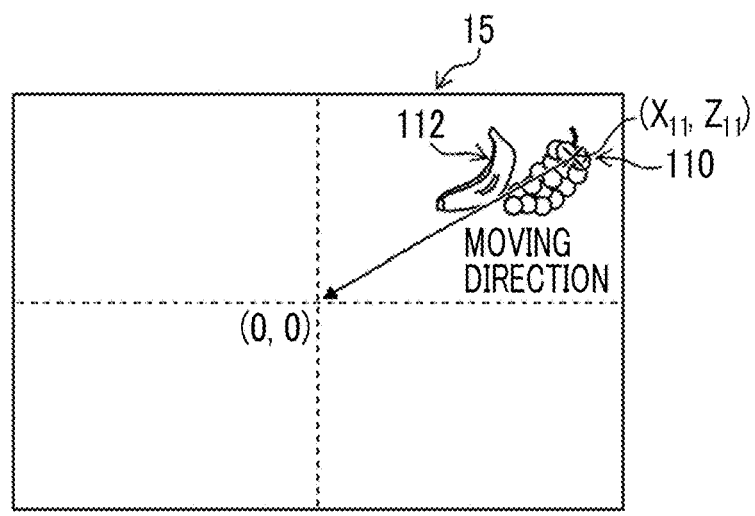

In this state, it is assumed that a position corresponding to the coordinates $(X_{11}, Z_{11})$ on the touch panel 15 is touched as illustrated in FIG. 14(b) (Step S3). The angle-of-view change operation is performed by the touch operation such that the object 110 displayed at the position corresponding to the coordinates $(X_{11}, Z_{11})$ is displayed at the origin (0, 0) which is the target position on the touch panel 15 (Step S5).

In this case, the imaging direction adjustment unit 32 controls the driving speed of the pan driving unit 32P and the driving speed of the tilt driving unit 32T such that the object moves on a straight line connecting the touch operation position and the target position and the optical axis L of the imaging optical system 21 is moved. Therefore, the moving direction of the object 110 is parallel to a straight line connecting the coordinates $(X_{11}, Z_{11})$ and the origin (0, 0) as illustrated in FIG. 14(b).

Then, in a case in which the time determination unit 60 determines that the touch operation has been performed again within the threshold time since the initial touch operation (Step S7), the average position acquisition unit 52 acquires the state of the pan driving unit 32P and the tilt driving unit 32T and determines whether the angle-of-view change operation is being performed (Step S41).

In a case in which the angle-of-view change operation has ended and the pan driving unit 32P and the tilt driving unit 32T have been stopped, the process proceeds to Step S8 and the same angle-of-view change process as described above is performed.

Figure 14C:
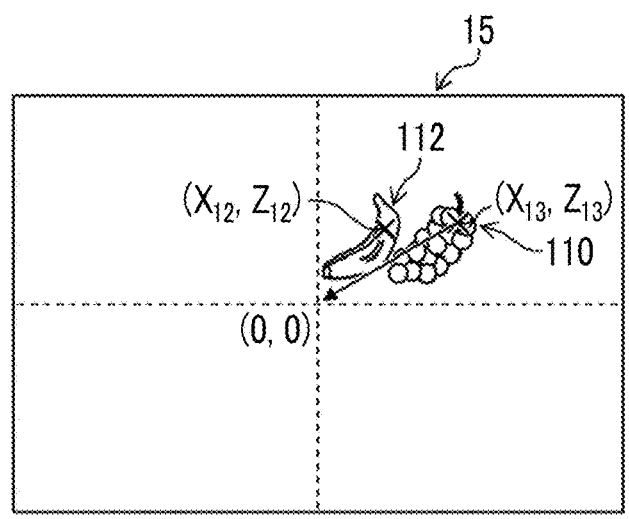

On the other hand, in a case in which the angle-of-view change operation is being performed, the average position acquisition unit 52 calculates an average position using an averaging process corresponding to the direction (moving direction) in which the angle-of-view change operation is performed. Here, it is assumed that, in a case in which the object 110 is displayed at the position corresponding to the coordinates $(X_{13}, Z_{13})$ on the touch panel 15 during the angle-of-view change operation, the position corresponding to the coordinates ($X_{12}$, $Z_{12}$) is touched as illustrated in FIG. 14(c). The object 112 is displayed at the position corresponding to the coordinates ($X_{12}$, $Z_{12}$).

In a case in which it is determined that the angle-of-view change operation is being performed, the average position acquisition unit 52 acquires the coordinates ($X_{13}$, $Z_{13}$) of the current display position of the object 110 displayed at the initial touch operation position. In addition, the designated position acquisition unit 50 acquires the coordinates ($X_{12}$, $Z_{12}$) of the position touched again. The average position acquisition unit 52 acquires the difference between the two points.

Then, the moving direction acquisition unit 64 (an example of moving direction acquisition means) acquires the amount of rotation in the pan direction and the amount of rotation in the tilt direction from the rotation amount conversion unit 54 and acquires the moving direction of the object 110 from the ratio of the amount of rotation in the pan direction to the amount of rotation in the tilt direction.

Figure 15:
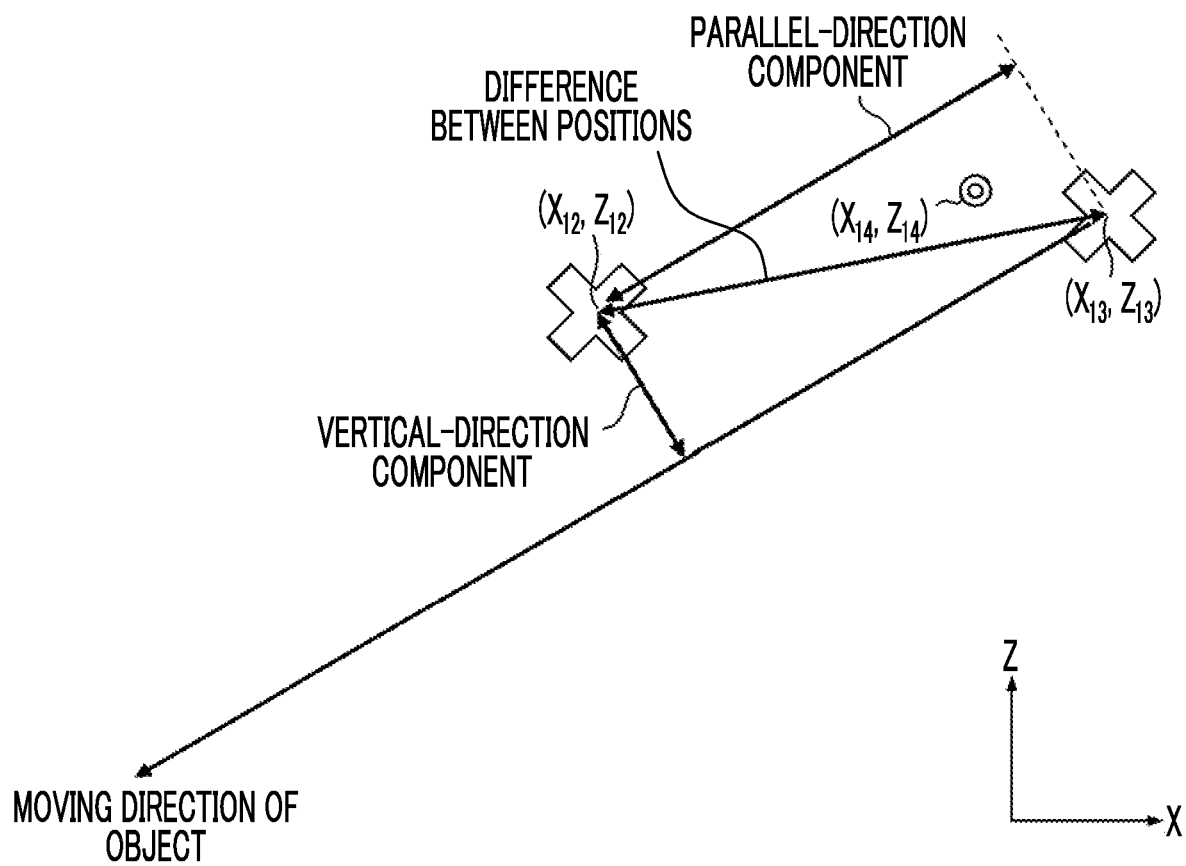
FIG. 15 is a diagram illustrating a parallel-direction component and a vertical-direction component with respect to the moving direction of an object.

Then, as illustrated in FIG. 15, the average position acquisition unit 52 decomposes the difference between the position touched again and the position of the object 110 when the touch operation is performed again into a component (an example of a parallel-direction component or a parallel component) that is parallel to the moving direction of the object 110 by the angle-of-view change operation and a component (an example of a vertical-direction component or a vertical component) that is perpendicular to the moving direction (Step S42).

Then, the display position change control unit 35 individually sets the averaging process coefficients in a case in which the average position of the position touched again and the position of the object 110 when the touch operation is performed again to an averaging process coefficient $W_H$ for the parallel-direction component and an averaging process coefficient $W_V$ for the vertical-direction component (Step S43). The averaging process coefficients $W_H$ and $W_V$ may be stored in the memory 56 in advance.

The averaging process coefficients are set such that a weight for the position of the object 110 for the parallel-direction component is greater than a weight for the position of the object 110 for the vertical-direction component. During the angle-of-view change operation, the amount of movement of the object in the direction parallel to the moving direction of the object is large and a position designation error is large. Therefore, the averaging process coefficient $W_H$ that causes the weight for the initial touch operation position to be large is set for the direction parallel to the moving direction of the object. In contrast, the position designation error is small in the direction perpendicular to the moving direction of the object. Therefore, the averaging process coefficient $W_V$ that causes the weight for the initial touch operation position to be less than that in the parallel direction is set for the direction perpendicular to the moving direction of the object.

The display position change control unit 35 performs the averaging process using the averaging process coefficients $W_H$ and $W_V$ to calculate an average position which is a new object position (Step S44). In the example illustrated in FIG. 15, the calculated average position is the position corresponding to the coordinates ($X_{14}$, $Z_{14}$). Then, the display position change control unit 35 converts the difference between the calculated average position and the target position into the amount of rotation of the imaging unit 30 in the pan direction and the amount of rotation of the imaging unit 30 in the tilt direction (Step S9) and performs the angle-of-view change operation on the basis of the amount of rotation in the pan direction and the amount of rotation in the tilt direction (Step S10). In this way, the object displayed at the position corresponding to the coordinates ($X_{14}$, $Z_{14}$) is displayed at the origin (0, 0) of the touch panel 15.

Since the average position is determined in this way, the weight for the touch operation position is small in the direction parallel to the moving direction of the object. Therefore, the degree of contribution of the current object position (initial touch operation position) is large. In contrast, since the weight for the touch operation position is relatively large in the direction perpendicular to the moving direction of the object, the degree of contribution of the current object position is relatively small. Therefore, the position designation error associated with the movement of the object is considered and the designated position in a case in which a desired object is designated is stabilized. As a result, it is possible to improve operability.

The technical scope of the invention is not limited to the scope described in the embodiments. For example, the configurations according to each embodiment can be appropriately combined with each other, without departing from the spirit and scope of the invention.

EXPLANATION OF REFERENCES

10: imaging system
11: terminal device
15: touch panel
16: operation button
20: camera device
21: imaging optical system
30: imaging unit
31: imaging element
31a: imaging surface
32: imaging direction adjustment unit
32P: pan driving unit
32T: tilt driving unit
34: camera-side controller
35: display position change control unit
50: designated position acquisition unit
52: average position acquisition unit
54: rotation amount conversion unit
56: memory
58: timer
60: time determination unit
62: position difference determination unit
64: moving direction acquisition unit
70: distance measurement unit
100, 102, 104, 110, 112: object
L: optical axis

What is claimed is:
1. An imaging system comprising:
a camera that acquires image data;
a controller configured to:
rotate the camera in a pan direction and a tilt direction perpendicular to the pan direction;
a display for displaying the image data on a display screen;
a touch panel for receiving an arbitrary position designated by a user on the display screen;
the controller further configured to:
in a case in which a first position on the display screen is designated, convert a difference between the first position on the display screen and a target position on the display screen into a first amount of rotation;

rotate the camera by the first amount of rotation as an amount of controlled rotation and a first designated object displayed at the first position is displayed at the target position;

measure a first time until a second position on the display screen is designated after the first position is designated;

determine whether the first time is shorter than a first threshold time;

acquire a third position which is a position of the first designated object on the display screen when the second position is designated;

perform simple averaging or weighted averaging for the second position and the third position to acquire a fourth position; and convert a difference between the fourth position and the target position into a second amount of rotation, wherein, in a case in which the controller determines that the first time is shorter than the first threshold time, the controller rotates the camera by the second amount of rotation as a new amount of controlled rotation and a second designated object displayed at the fourth position is displayed at the target position.

2. The imaging system according to claim 1, wherein the controller is further configured to convert a difference between the second position on the display screen and the target position on the display screen into a third amount of rotation, wherein, in a case in which the controller determines that the first time is equal to or longer than the first threshold time, the controller rotates the camera by the third amount of rotation as a new amount of controlled rotation and a third designated object displayed at the second position is displayed at the target position.

3. The imaging system according to claim 1, wherein the controller is further configured to:

convert a difference between the second position on the display screen and the target position on the display screen into a third amount of rotation; and determine whether the difference between the second position and the target position is greater than a first threshold distance, wherein, in a case in which the controller determines that the difference is greater than the first threshold distance, controller rotates the camera by the third amount of rotation as a new amount of controlled rotation and a third designated object displayed at the second position is displayed at the target position, regardless of a determination result of the controller.

4. The imaging system according to claim 1, wherein the controller increases a weight for the second position as the first time increases and performs the weighted averaging for the second position and the third position.

5. The imaging system according to claim 1, wherein the controller is further configured to:

measure a distance between the camera and the third designated object displayed at the second position, wherein the controller increases the weight for the second position as the measured distance is reduced and performs the weighted averaging for the second position and the third position.

6. The imaging system according to claim 1, wherein the controller is further configured to:

acquire a moving direction of the first designated object from the first position to the target position on the display screen, wherein the controller decomposes a difference between the second position and the third position into a parallel component that is parallel to the moving direction and a vertical component that is perpendicular to the moving direction, sets a weight for the third position for the parallel component to be greater than a weight for the third position for the vertical component, and performs the weighted averaging for the second position and the third position.

7. The imaging system according to claim 1, wherein the controller is further configured to: measure a second time until a plurality of positions on the display screen are designated after the first position is designated, determine whether the second time is shorter than the first threshold time, acquire a fifth position which is a position of the first designated object on the display screen when the plurality of positions are designated, perform the simple averaging or the weighted averaging for the plurality of positions and the fifth position to acquire a sixth position, convert a difference between the sixth position and the target position into a fourth amount of rotation, and in a case in which the controller determines that the second time is shorter than the first threshold time, the controller rotates the camera by the fourth amount of rotation as a new amount of controlled rotation and a fourth designated object displayed at the sixth position is displayed at the target position.

8. The imaging system according to claim 1, wherein the touch panel enables a user to designate an arbitrary position on the display screen with a touch operation.

9. The imaging system according to claim 1, wherein the target position is a position of a center of the display screen.

10. The imaging system according to claim 1, further comprising:

a remote camera; and a portable terminal, wherein at least the display and the touch panel are provided in the portable terminal, at least the camera and the controller are provided in the remote camera, and each of the remote camera and the portable terminal comprises communication unit for performing communication.

11. An imaging control method comprising:

a pan/tilt step of rotating a camera that acquires image data in a pan direction and a tilt direction perpendicular to the pan direction, using a controller;

a display step of displaying the image data on a display screen;

a designation receiving step of receiving an arbitrary position designated by a user on the display screen;

a first conversion step of, in a case in which a first position on the display screen is designated, converting a difference between the first position on the display screen and a target position on the display screen into a first amount of rotation which is an amount of rotation by the controller;

a pan/tilt control step of controlling the controller such that the camera is rotated by the first amount of rotation as an amount of controlled rotation and a first designated object displayed at the first position is displayed at the target position;

a time measurement step of measuring a first time until a second position on the display screen is designated after the first position is designated;

a determination step of determining whether the first time is shorter than a first threshold time;

an acquisition step of acquiring a third position which is a position of the first designated object on the display screen when the second position is designated;

an averaging step of performing simple averaging or weighted averaging for the second position and the third position to acquire a fourth position; and a second conversion step of converting a difference between the fourth position and the target position into a second amount of rotation which is an amount of rotation by the controller, wherein, in a case in which it is determined in the determination step that the first time is shorter than the first threshold time, in the pan/tilt control step, the controller rotates the camera by the second amount of rotation as a new amount of controlled rotation and a second designated object displayed at the fourth position is displayed at the target position.

\* \* \* \* \*